United States Patent [19]

Miller

[11] Patent Number: 5,546,242

[45] Date of Patent: Aug. 13, 1996

[54] DEVICE FOR WRITING ON A CARD-SHAPED DATA MEMORY HAVING SENSORS FOR DETECTING MAGNETIC STRIPS AND FOR SWITCHING OFF THE MAGNETIC HEAD WHEN NO MAGNETIC STRIP IS PRESENT

[75] Inventor: Gert Miller, Mönchengladbach, Germany

[73] Assignee: Scheidt & Bachmann GmbH, Mönchengladbach, Germany

[21] Appl. No.: 362,832

[22] Filed: Dec. 23, 1994

[30] Foreign Application Priority Data

May 7, 1994 [EP] European Pat. Off. .............. 94107176

[51] Int. Cl.⁶ ............................. G11B 25/04; G06K 7/08; G06K 7/00
[52] U.S. Cl. ................. 360/2; 235/449; 235/440
[58] Field of Search ................... 360/2, 60, 61, 360/63; 235/449, 436, 440, 384

[56] References Cited

U.S. PATENT DOCUMENTS 3,869,718  3/1975  Schmidt ...................... 360/60
4,002,887  7/1977  Ouimette ..................... 235/61.11 D

FOREIGN PATENT DOCUMENTS 0521172  1/1993  European Pat. Off. .
2157867  10/1985  United Kingdom .

*Primary Examiner*—W. Chris Kim
*Attorney, Agent, or Firm*—Robert W. Becker & Associates

[57] ABSTRACT

A device for writing on a card-shaped data memory with at least one magnetic strip on the card-shaped data memory has a card slot through which the card-shaped data memory is guided. The card slot has an inlet and an outlet. One pair of write heads and at least one sensor are provided for each of the magnetic strips on the card-shaped data memory. The write heads are arranged on opposite sides of the Card slot for writing on the magnetic strip. The at least one sensor is positioned at the inlet of the card slot for detecting the presence or absence of the magnetic strip coordinated therewith. The at least one sensor, when detecting the presence of the magnetic strip coordinated therewith, switches to an inactive state one of the write heads of the pair that is positioned on a side of the card slot remote from the magnetic strip.

4 Claims, 4 Drawing Sheets

5,546,242

DEVICE FOR WRITING ON A CARD-SHAPED DATA MEMORY HAVING SENSORS FOR DETECTING MAGNETIC STRIPS AND FOR SWITCHING OFF THE MAGNETIC HEAD WHEN NO MAGNETIC STRIP IS PRESENT

BACKGROUND OF THE INVENTION

The present invention relates to a device for writing on card-shaped data memories with at least one magnetic strip that is positioned on the upper side or underside in the center or to the side. The device has a card slot in which at least two oppositely arranged write heads for writing on the at least one magnetic strip on the upper side or the underside of the card-shaped data memory are provided. At least one read head and at least one sensor arranged at one end of the card slot are also provided.

Such devices for writing on card-shaped data memories used in connection with vending machines and service machines are known, for example, from European Patent Application 0 521 172. In order to be able to write on the magnetic strip independent of the insertion direction of the card-shaped data memory into the card slot and independent of the correct positioning of the upper side and underside, it is suggested to use instead of one single write head two oppositely arranged write heads within the card slot. The paired, oppositely arranged write heads in the known device are activated simultaneously so that the magnetic strip is written on even when the insertion direction of the card-shaped data memory into the card slot is switched with respect to the upper side and underside.

In this arrangement of paired, oppositely arranged write heads there is a risk that the magnetic fields positioned opposite one another affect the simultaneously activated write heads to a greater or lesser extent so that the information written on the magnetic strip of the card-shaped data memory can be falsified.

It is therefore an object of the present invention to improve the device for writing on card-shaped data memories of the aforementioned kind, without impairing the simple handling by the user, such that a falsification of the information to be written on the magnetic strip due to mutual influences of the oppositely arranged write heads is prevented.

SUMMARY OF THE INVENTION

The device for writing on a card-shaped data memory with at least one magnetic strip provided on the card-shaped data memory according to the present invention is primarily characterized by:

A card slot through which the card-shaped data memory is guided, the card slot having an inlet and an outlet;

One pair of write heads and at least one sensor provided for each one of the magnetic strips on the card-shaped data memory;

The write heads arranged on opposite sides of the card slot for writing on the magnetic strip coordinated therewith;

The at least one sensor positioned at the inlet of the card slot for detecting the presence or absence of the magnetic strip coordinated therewith;

The at least one sensor, when detecting the presence of the magnetic strip coordinated therewith, switching to an inactive state that one of the write heads that is positioned on a side of the card slot remote from the magnetic strip.

Preferably, two sensors are positioned opposite one another at the inlet for each of the magnetic strips.

Advantageously, the at least one sensor is a sound film head.

Expediently, switching to the inactive state takes place in the proximity of that one write head.

According to the present invention, at the inlet of the card slot a sensor for detecting the presence or absence of the magnetic strip is arranged on at least one side of the card slot for each magnetic strip of the data memory designed to be processed with the device. The sensor upon detecting a magnetic strip switches to an inactive state the write head positioned on the side of the card slot remote from the magnetic strip.

With the inventive device it is ensured that independent of the insertion direction of the data memory in the correct or switched position with respect to the upper side and underside thereof only one write head is activated i.e., the write head on the side of the card-shaped data memory having the magnetic strip. The other with head which is positioned on the other side of the card slot is switched inactive so that it cannot falsify or affect data to be written on the magnetic strip.

When only one sensor for detecting a magnetic strip is arranged within the inlet of the card slot for the corresponding magnetic strip, the write head on the opposite side of the card slot is switched off upon detection of a magnetic strip by the sensor. When the sensor does not detect a magnetic strip, the write head on the same side of the card slot as the sensor is switched off. In this scenario, it is checked with a read head arranged downstream whether data are present on the magnetic strip which is supposedly present. If this is not the case, the card-shaped data memory is rejected and returned. In this case the data memory inserted is not a magnetic memory card or is a magnetic memory card that is not accepted by the device or it is a magnetic memory card with a defective magnetic strip.

If it is desired to detect immediately upon insertion into the card slot whether the data memory (memory card) is suitable for the device, it is possible to provide according to a further development of the present invention a pair of sensors arranged opposite one another for detecting magnetic strips within the inlet of the card slot. Preferably, these sensors can be in the form of magnetic heads as commonly used for sound recording. The sensor which detects a magnetic strip then switches off the write head which is positioned on the other side of the card slot (remote from the detected magnetic strip).

In order to prevent the emission of false signals from the corresponding inactive write head, it is suggested with the present invention to carry out the switching off of the respective write head in its direct proximity.

BRIEF DESCRIPTION OF THE DRAWINGS

The object an advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 7.

Figure 1:
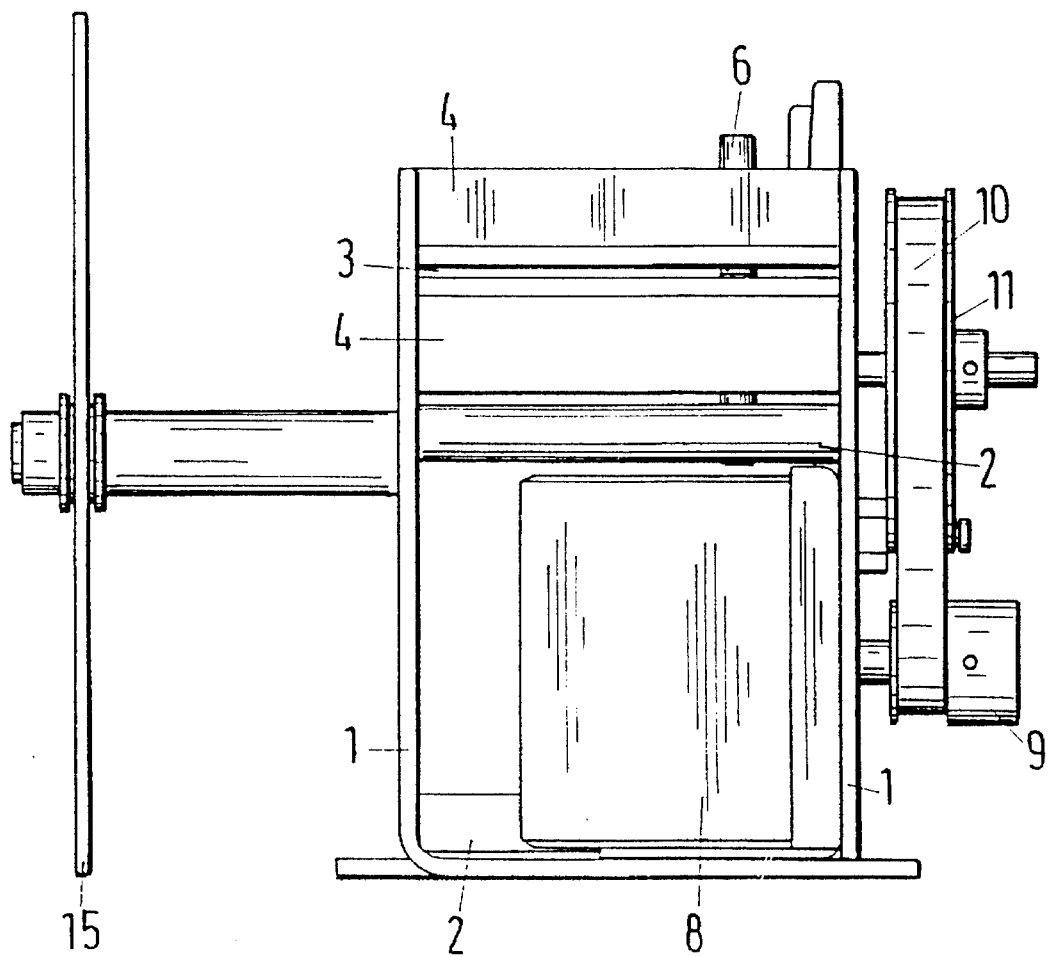
FIG. 1 shows an end view of the device.
Figure 2:
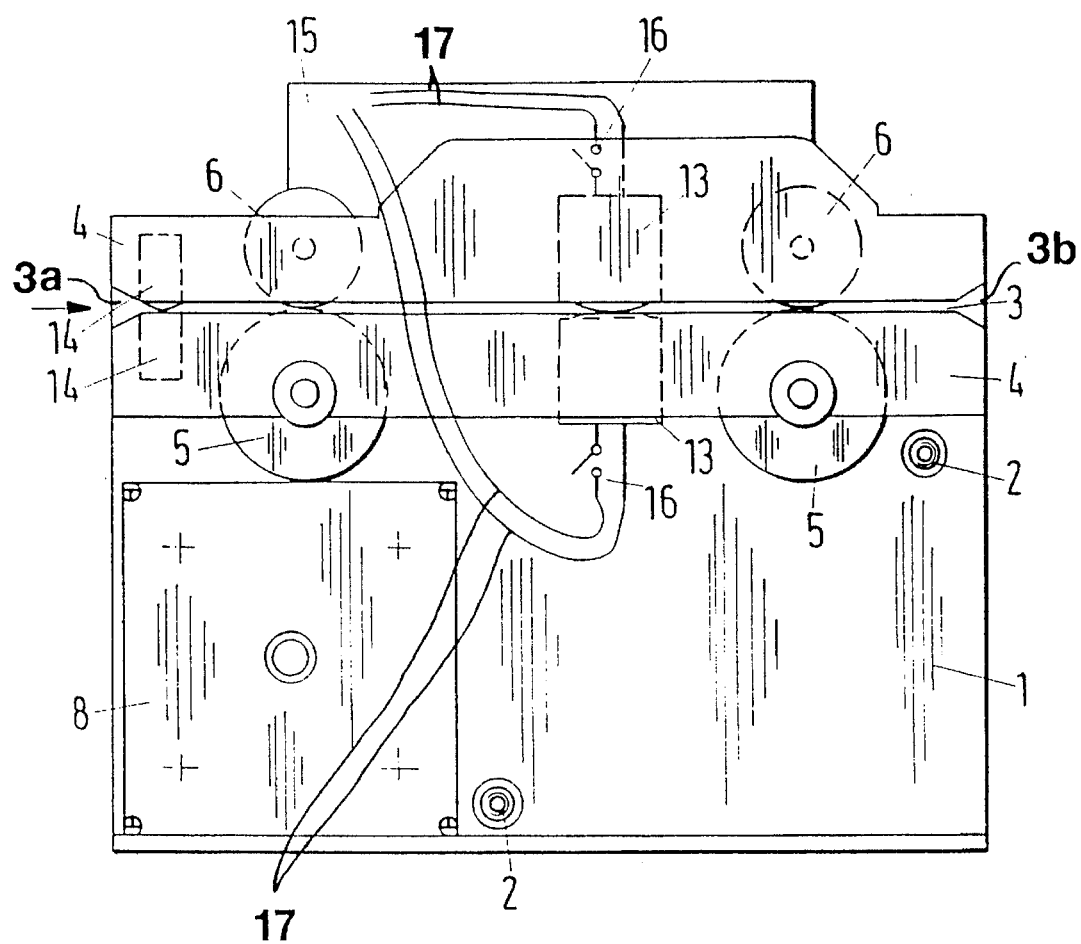
FIG. 2 shows a side view of the device of FIG. 1.
Figure 3:
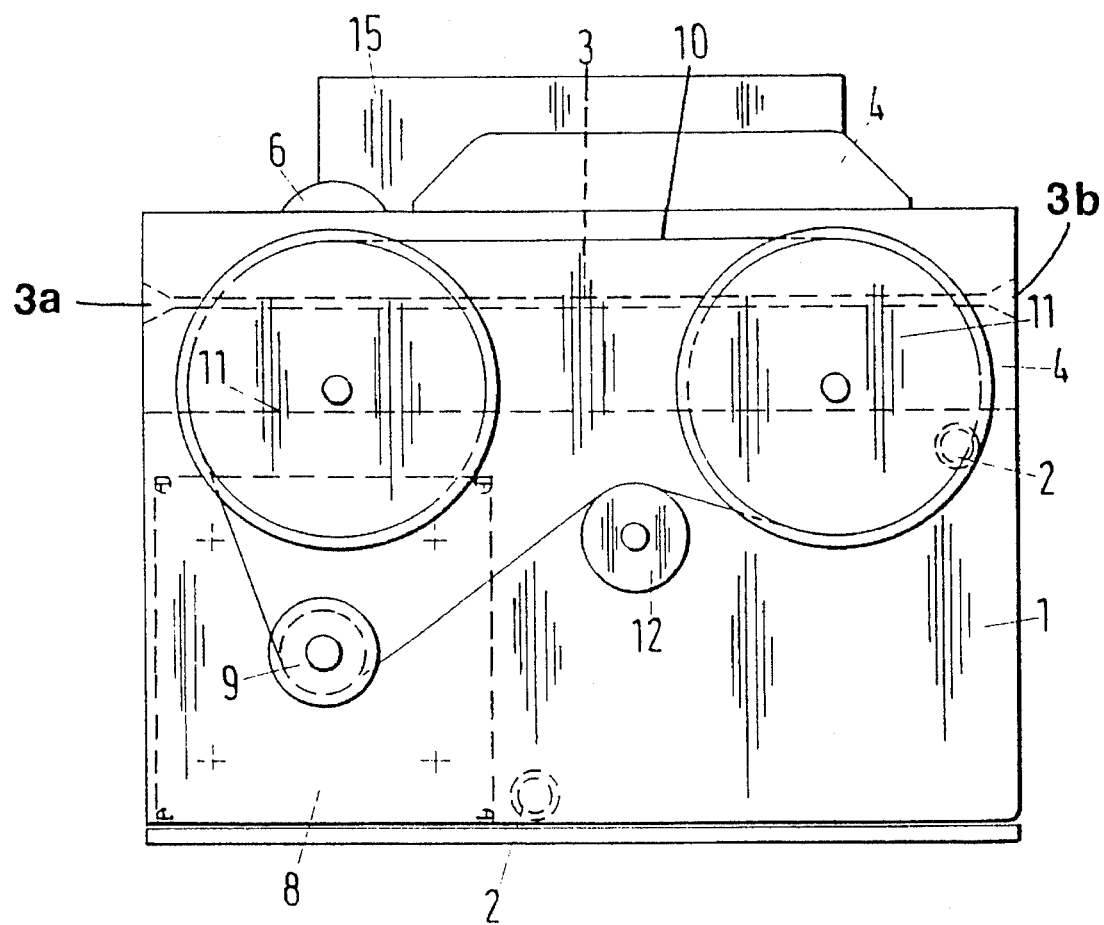
FIG. 3 shows the other side of the device according to FIG. 1.
Figure 4:
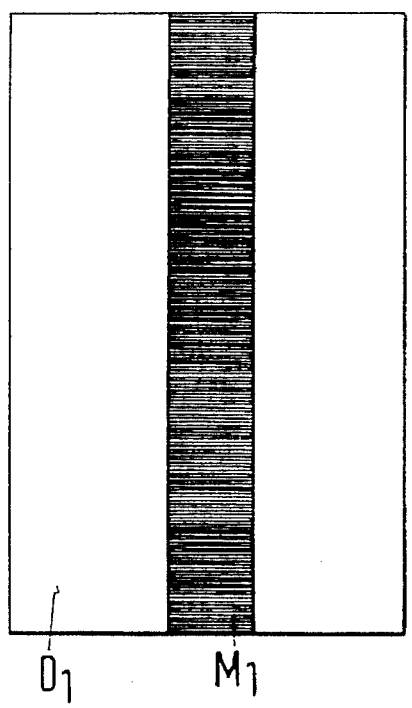
FIG. 4 shows a first embodiment of a card-shaped data memory with a centrally arranged magnetic strip.
Figure 6:
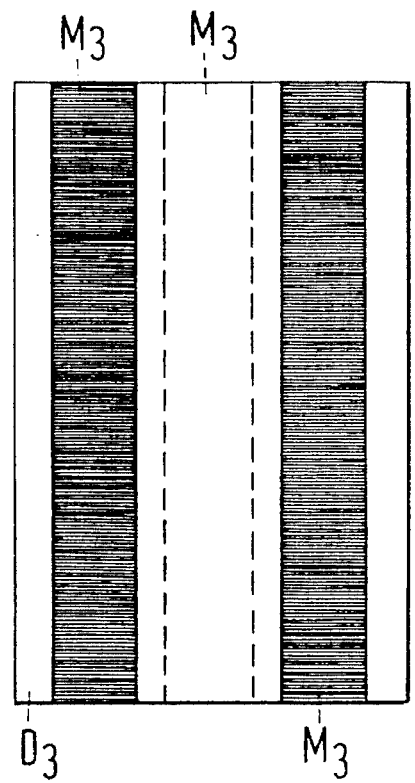
FIG. 6 shows the upper side.
Figure 7:
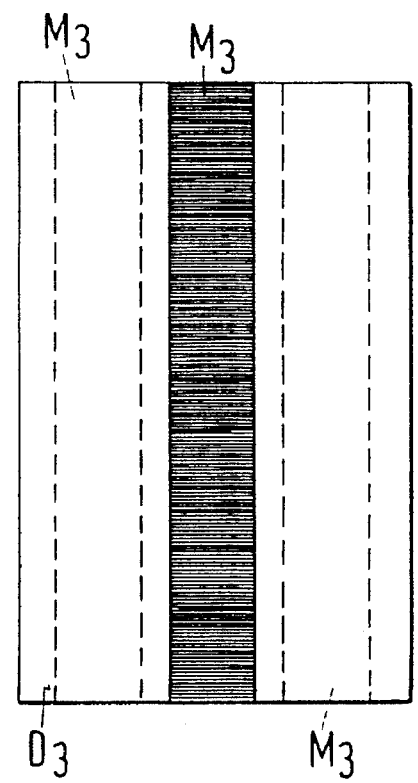
FIG. 7 shows the underside of a third embodiment of a card-shaped data memory whereby on the upper side two laterally positioned magnetic strips and on the underside one centrally arranged magnetic strip are provided.

The device for writing and reading card-shaped data memories D represented in FIGS. 1 through 3 is designed to process data memories (magnetic memory cards) according to FIG. 4. This memory card design has been used (in order to simplify the description of the function of the device). In this embodiment, the card-shaped data memory $D_1$ is provided with a magnetic strip $M_1$ only on one side. Of course, the device for writing and reading data memories can also be designed to process data memories $D_2$ and $D_3$ as shown in FIGS. 5 and 6, 7, respectively, which have a different arrangement of magnetic strips $M_2$ and $M_3$.

Figure 5:
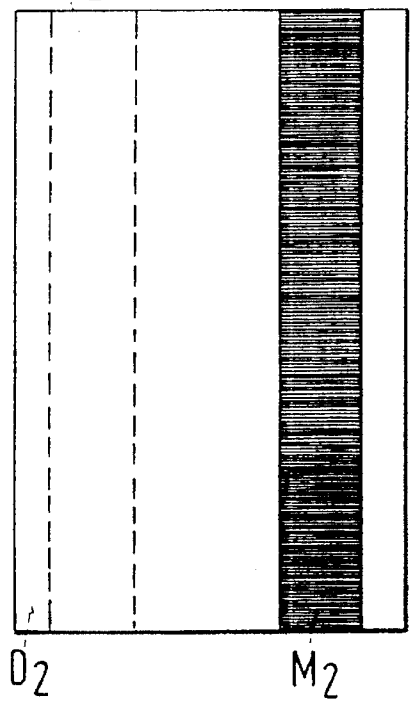
FIG. 5 shows a second embodiment of a data memory with laterally displaced magnetic strips on the upper side and on the underside of the card-shaped data memory.

In the embodiment according to FIG. 5 the card-shaped data memory $D_2$ is provided on the upper side as well as on the underside with a respective magnetic strip $M_2$ that is laterally positioned. The third embodiment according to FIGS. 6 and 7 shows a card-shaped data memory $D_3$ which according to FIG. 6 has on the upper side two laterally positioned magnetic strips $M_3$ and on the underside according to FIG. 7 has a centrally arranged further magnetic strip $M_3$.

In the embodiment according to FIGS. 1 to 3 the device has two side walls 1 which are connected at a distance to one another by spacer rods 2. Within the housing defined by the side walls and the spacer rods 2 a card slot 3 is formed by guides 4. This card slot 3 can be seen best in FIG. 2 in which the insertion direction of the card-shaped data memory D is indicated by an arrow.

Two drive rollers 5 project from the bottom into the card slot 3 having an inlet $3a$ and an outlet $3b$. The drive rollers 5 cooperate with respective pressing rollers 6 positioned above the card slot 3 and freely rotatable. Both pressing rollers 6 are loaded in the direction of the corresponding drive rollers 5 by a pressure spring.

The drive rollers 5 are driven by a step motor 8 having arranged on the drive shaft a drive pinion 9 for a toothed belt 10. The toothed belt 10 is guided about two belt pinions 11 that are connected to the shaft of the drive rollers 5. In order to provide for a uniform tension of the toothed belt 10, a tensioning roller 12 is provided. With the aid of the aforedescribed drive a card-shaped data memory D can be transported in a uniform movement in both directions within the card slot 3.

Within the card slot 3, in the embodiment shown in FIGS. 1 to 3, two oppositely arranged write heads 13 for writing on the centrally arranged magnetic strip $M_1$ of the data memory $D_1$ (FIG. 4) are arranged. These heads can also be write/read heads positioned within the housing. At the inlet $3a$ of the card slot 3 sensors 14 are provided that are coordinated with the write heads 13. The sensors 14 in the shown embodiment are arranged as a pair. They are preferably in the form of magnetic heads as commonly used for sound recording.

Upon insertion of a data memory $D_1$ the upper sensor 14, for example, detects a magnetic strip $M_1$ while the lower sensor 14 does not detect a magnetic strip. In this case, the lower write head 13 is switched into an inactive state by a data processing circuit provided on a printed circuit board 15. Thus, the magnetic field of the write head 13 that has been switched to an inactive state cannot lead to a falsification of the data to be written by the upper write head 13 onto the magnetic strip $M_1$.

The switching into an inactive state of the respective write head 13 takes place in its direct proximity. In FIG. 2 relay contacts 16 are symbolically shown for this purpose, the relays being open when the respective-write head 13 is switched to the inactive state. These relay contacts 16 are connected with lines 17 to the printed circuit board 15. Of course, the means for switching the respective write head 13 into the inactive state must not be a relay contact. Of course, it is possible to use any suitable electric, electronic, or optical component for this purpose.

When data memories $D_2$ or $D_3$ provided with a plurality of magnetic strips $M_2$ and $M_3$ are to be processed by the inventive device, a correspondingly greater number of sensors 14 is provided at the inlet of the card slot 3. In this context it is possible, as shown in the embodiment of FIGS. 1 to 3, to arrange the sensors 14 in pairs. As mentioned previously, it is also possible to provide only one sensor 14 for each magnetic strip $M_2$ or $M_3$ of the data memories $D_2$ and $D_3$ that are suitable for processing with the inventive device.

The present invention is, of course, in no way restricted to the specific disclosure of the specification and drawings, but also encompasses any modifications within the scope of the appended claims.

What I claim is:

1. A device for writing on a card-shaped data memory with at least one magnetic strip provided on the card-shaped data memory, said device comprising:

a card slot through which the card-shaped data memory is guided, said card slot having an inlet and an outlet;

one pair of write heads and at least one sensor provided for each one of the magnetic strips on the card-shaped data memory;

said write heads arranged on opposite sides of said card slot for writing on the magnetic strip coordinated therewith;

said at least one sensor positioned at said inlet of said card slot for detecting the presence or absence of the magnetic strip coordinated therewith;

said at least one sensor, when detecting the presence of the magnetic strip coordinated therewith, activating a switching means for switching to an inactive state that one of said write heads that is positioned on a side of said card slot remote from the magnetic strip.

2. A device according to claim 1, wherein two said sensors are positioned opposite one another at said inlet for each of said magnetic strips.

3. A device according to claim 1, wherein said at least one sensor is a magnetic head.

4. A device according to claim 1, wherein switching to the inactive state takes place in the proximity of said one write head.

* * * * *